United States Patent
Monroe et al.

(10) Patent No.: US 8,081,419 B2
(45) Date of Patent: Dec. 20, 2011

(54) INTERCONNECTIONS FOR MULTIPLE CAPACITOR ANODE LEADS

(75) Inventors: Donald Monroe, Corfu, NY (US); Kent Hughes, Lancaster, NY (US); Anthony Perez, Wheatfield, NY (US); J. Michael Druding, Orchard Park, NY (US); Shawn Patterson, Buffalo, NY (US)

(73) Assignee: Greatbatch Ltd., Clarence, NY (US)

( * ) Notice: Subject to any disclaimer, the term of this patent is extended or adjusted under 35 U.S.C. 154(b) by 633 days.

(21) Appl. No.: 12/250,598

(22) Filed: Oct. 14, 2008

(65) Prior Publication Data

US 2009/0103246 A1    Apr. 23, 2009

Related U.S. Application Data

(60) Provisional application No. 60/980,469, filed on Oct. 17, 2007.

(51) Int. Cl.
*H01G 9/04* (2006.01)
*H01G 9/15* (2006.01)
*H01G 9/00* (2006.01)

(52) U.S. Cl. ........ 361/528; 361/535; 361/531; 361/515; 29/25.03

(58) Field of Classification Search .......... 361/508–510, 361/515, 528, 531, 535; 29/25.03
See application file for complete search history.

(56) References Cited

U.S. PATENT DOCUMENTS

| | | | |
|---|---|---|---|
| 3,456,157 A | 7/1969 | Beemer | |
| 4,009,425 A * | 2/1977 | Muranaka et al. | 361/515 |
| 5,517,171 A | 5/1996 | Kotani et al. | |
| 5,597,461 A * | 1/1997 | Pate | 228/170 |
| 6,200,156 B1 | 3/2001 | Hiraki et al. | |
| 6,343,004 B1 * | 1/2002 | Kuranuki et al. | 361/523 |
| 6,392,869 B2 * | 5/2002 | Shiraishi et al. | 361/523 |
| 6,587,029 B2 | 7/2003 | Miyamoto | |
| 6,616,713 B2 | 9/2003 | Sano et al. | |
| 6,625,009 B2 * | 9/2003 | Maeda | 361/528 |
| 6,751,086 B2 * | 6/2004 | Matsumoto | 361/523 |
| 6,891,717 B2 * | 5/2005 | Fujii et al. | 361/523 |
| 7,016,179 B2 * | 3/2006 | Ando | 361/523 |

(Continued)

FOREIGN PATENT DOCUMENTS

JP    2002075807    3/2002

OTHER PUBLICATIONS

European Search Report, dated Feb. 16, 2009.

*Primary Examiner* — Anatoly Vortman
(74) *Attorney, Agent, or Firm* — Michael F. Scalise

(57) ABSTRACT

An anode assembly for a capacitor is described. The anode assembly comprises a first anode including a first conductive lead disposed in a first groove in a junction bar, a second anode including a second conductive lead disposed in a second groove in the junction bar, and an anode terminal lead disposed in a third groove in the junction bar. The capacitor including the anode assembly is further comprised of a cathode comprising a conductive substrate supporting a cathode active material facing the first and second anodes, and a separator positioned there between to prevent the first and second anodes and the cathode from contacting each other. The anode assembly, the cathode, and the separator are sealed inside of a casing, and the casing is filled with a working electrolyte.

25 Claims, 9 Drawing Sheets

U.S. PATENT DOCUMENTS

| | | |
|---|---|---|
| 7,031,140 B2 | 4/2006 | Omura et al. |
| 7,352,562 B2 * | 4/2008 | Tanaka .......................... 361/540 |
| 7,551,424 B2 * | 6/2009 | Kuriyama ..................... 361/528 |
| 2004/0066608 A1 * | 4/2004 | Takagi et al. ................. 361/530 |
| 2005/0117280 A1 | 6/2005 | Audo |
| 2006/0156521 A1 | 7/2006 | Miura et al. |
| 2007/0035912 A1 | 2/2007 | Hahn et al. |
| 2007/0081301 A1 * | 4/2007 | Tanaka .......................... 361/540 |

* cited by examiner

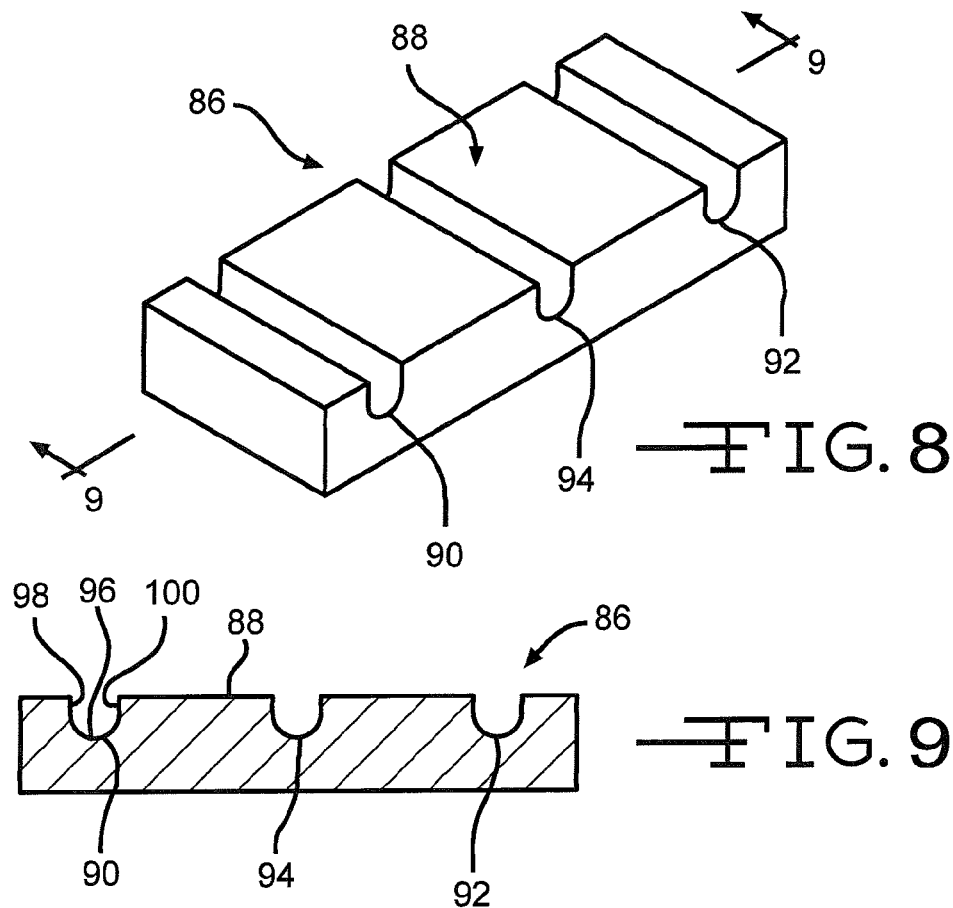
FIG. 8
FIG. 9
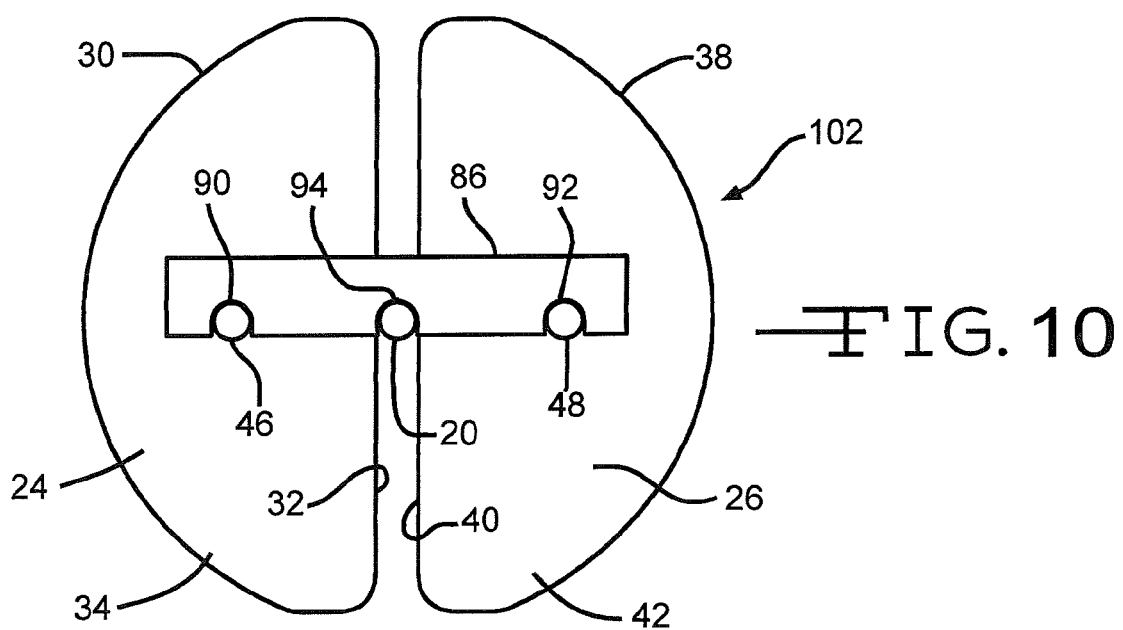
FIG. 10

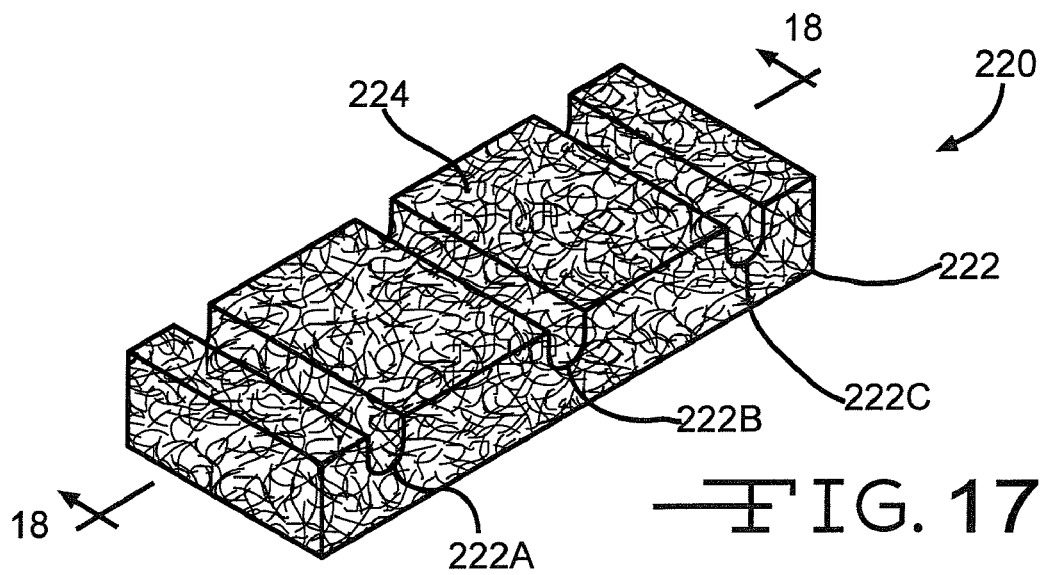
FIG. 17
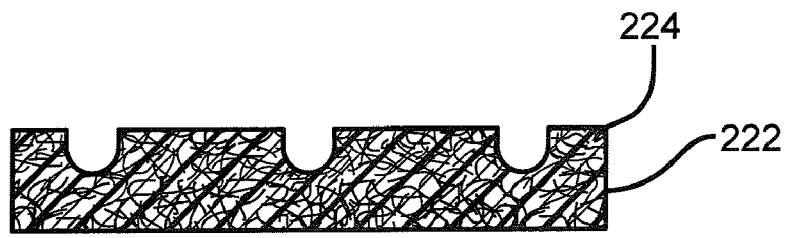
FIG. 18
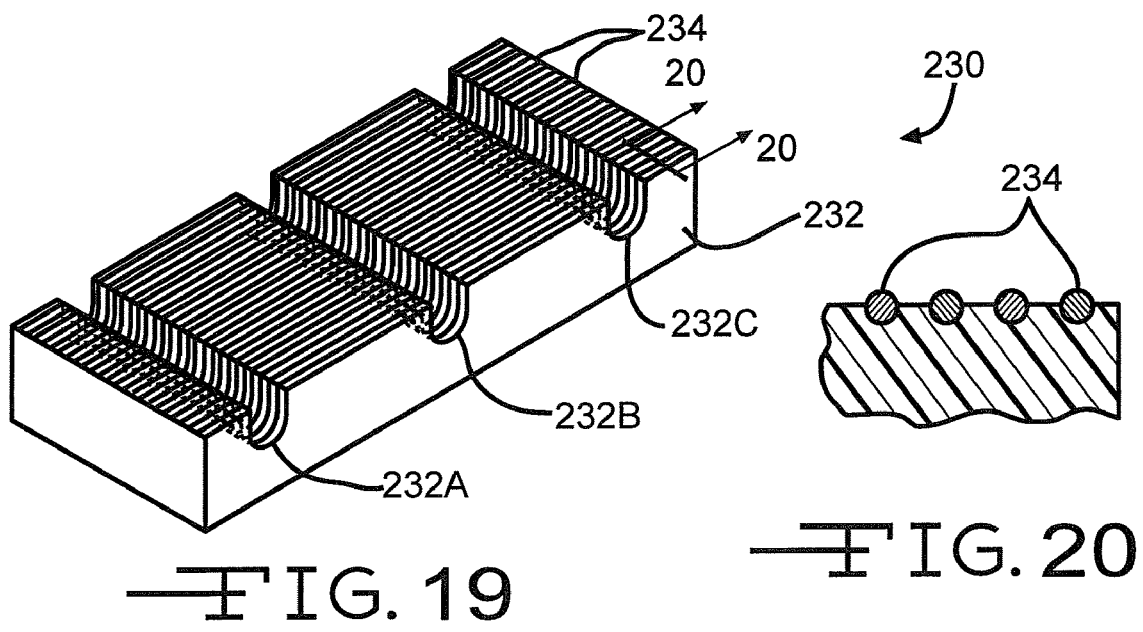
FIG. 19
FIG. 20

INTERCONNECTIONS FOR MULTIPLE CAPACITOR ANODE LEADS

CROSS-REFERENCE TO RELATED APPLICATION

This application claims priority from U.S. provisional patent application Ser. No. 60/980,469, filed Oct. 17, 2007.

BACKGROUND OF THE INVENTION

1. Field of the Invention

The present invention generally relates to a capacitor and, more particularly, to a compact capacitor having multiple anodes.

2. Prior Art

Certain types of capacitors, such as a wet tantalum capacitor, may be designed and built to contain multiple anodes. Prior to being assembled into an external case, each anode is sealed inside a polypropylene and/or another separator material. For some applications in which the capacitor may be inserted into the vasculature of a patient, the overall capacitor configuration may be cylindrical with an aspect ratio (i.e. length:diameter ratio) much greater than one. The aspect ratio may be 10 or more. To obtain high energy density in the capacitor, the net combined shape of the anodes contained therein may also be cylindrical with comparable aspect ratios.

For example, U.S. Pat. No. 7,072,171 to Muffoletto et al., which is assigned to the assignee of the present invention and incorporated herein by reference, describes a capacitor comprised of a casing having a cylindrical casing sidewall extending to closed opposed first and second end walls; and a first anode and a second anode, each comprising a radiused anode sidewall portion meeting a planar sidewall portion extending to first and second anode end walls, wherein the anodes are in a side-by-side relationship having the respective planar sidewall portions facing each other. The capacitor further includes a cathode comprising a conductive substrate having first and second major faces supporting a cathode active material which opposes the sidewalls of the first and second anodes. The first and second anodes include respective anode leads extending from their first end walls. The anode leads are joined to a terminal pin provided between the anodes and the first end wall of the casing.

Additionally, U.S. patent application Ser. No. 61/050,716, filed May 6, 2008, which is assigned to the assignee of the present invention and incorporated herein by reference, discloses a capacitor with a casing having a cylindrical casing sidewall extending to closed first and second end walls, and an anode assembly including first, second and third anodes. Each anode comprises a surrounding sidewall extending to first and second anode end walls and a conductive lead extending therefrom. The anodes are in a side-by-side relationship within the casing with their respective sidewalls parallel to each other.

There is a benefit to providing a capacitor with multiple anodes, i.e. more than one anode, because subdividing the anode material mass and providing corresponding opposed cathode material increases the overall active surface area of the capacitor electrodes. Thus, a greater overall capacitance can be attained within the same casing volume. However, each anode lead must be electrically connected to a common anode terminal pin in a compact space. Accordingly, "multiple anode lead management" for capacitor configurations that include two or more anodes becomes critical in the overall capacitor design.

There is, therefore, a need to minimize the amount of non-active intradevice volume being utilized for connection between the anode leads and the terminal pin, and the adjoining glass-to-metal-seal (GTMS) assembly that seals and electrically insulates the terminal pin to the capacitor casing. There is also a need for a robust method for interconnection of multiple anode leads to the positive termination, i.e. the terminal lead.

SUMMARY OF THE INVENTION

In accordance with the present invention, connecting two or more anode leads and a terminal lead within a capacitor casing is addressed by providing a conductive junction bar that includes a sufficient number of grooves to receive the leads. An anode assembly is made which comprises at least a first anode including a first conductive lead disposed in a first groove in the junction bar, a second anode including a second conductive lead disposed in a second groove in the junction bar, and an anode terminal lead disposed in a third groove in the junction bar.

A capacitor that includes the anode assembly is further comprised of a cathode comprising a conductive substrate supporting a cathode active material facing the first and second anodes, and a separator positioned between the first and second anodes and the cathode to prevent them from contacting each other. The anode assembly, cathode, and separator are sealed inside of a casing, and the casing is filled with a working electrolyte.

The grooves in the junction bar that receive the leads may have various shapes. The grooves may have a rectangular cross-section, or a semi-circular cross-section, or another cross-sectional shape. The leads may be joined to the junction bar by press-fitting, but are preferably joined to the junction bar by welding.

The casing of the capacitor may have a cylindrical shape, with the anode assembly having a similar cylindrical shape wherein each anode is comprised of a radiused anode sidewall portion meeting a planar sidewall portion, both portions extending to first and second anode end walls. The anodes are in a side-by-side relationship having their respective planar sidewalls facing each other.

Also according to the present invention, a method for making a capacitor is disclosed. The method comprises providing a junction bar having at least a first groove, a second groove, and a third groove; and a first anode comprising a first conductive lead, a second anode comprising a second conductive lead, and an anode terminal lead. The first conductive lead, second conductive lead, and terminal lead are nested to the respective first, second, and third grooves in the junction bar. A cathode comprising a first conductive substrate supporting a cathode active material is positioned facing the anodes, but prevented from contact therewith by an intermediate separator, to thereby form an electrode assembly. The anode terminal lead is sealed and electrically insulated from a casing lid, and the casing lid is sealed to a casing container portion to enclose the electrode assembly within the casing. A working electrolyte is delivered into the casing through a fill port, and the fill port is sealed to complete the capacitor.

The foregoing and additional objects, advantages, and characterizing features of the present invention will become increasingly more apparent upon a reading of the following detailed description together with the included drawings.

BRIEF DESCRIPTION OF THE DRAWINGS

The present invention will be described by reference to the following drawings, in which like numerals refer to like elements, and in which:

FIG. 8 is a perspective view of a second embodiment of a junction bar 86 for electrically connecting the anode leads 46, 48 and terminal lead 20 of a capacitor.

FIG. 9 is a cross-sectional view of the junction bar 86 taken along line 9-9 of FIG. 8.

FIG. 10 is a plan view of an anode assembly 102 of a capacitor, which comprises the junction bar 86 of FIG. 8.

FIG. 17 is a perspective view of still another embodiment of a junction bar 220 according to the present invention.

FIG. 18 is a cross-sectional view taken along line 18-18 of FIG. 17.

FIG. 19 is a perspective view of a further embodiment of a junction bar 230 according to the present invention.

FIG. 20 is a cross-sectional view taken along line 20-20 of FIG. 19.

The present invention will now be described in connection with preferred embodiments, however, it should be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION OF THE PREFERRED EMBODIMENTS

In describing the present invention, a variety of terms are used in the description. As used herein, unless noted otherwise, the term "conductive" is used with reference to electrical conductivity and is meant to indicate a property of a material as being electrically conductive at a level suitable for use in an electrical device such as a capacitor, or in an electrical circuit.

Figure 1:
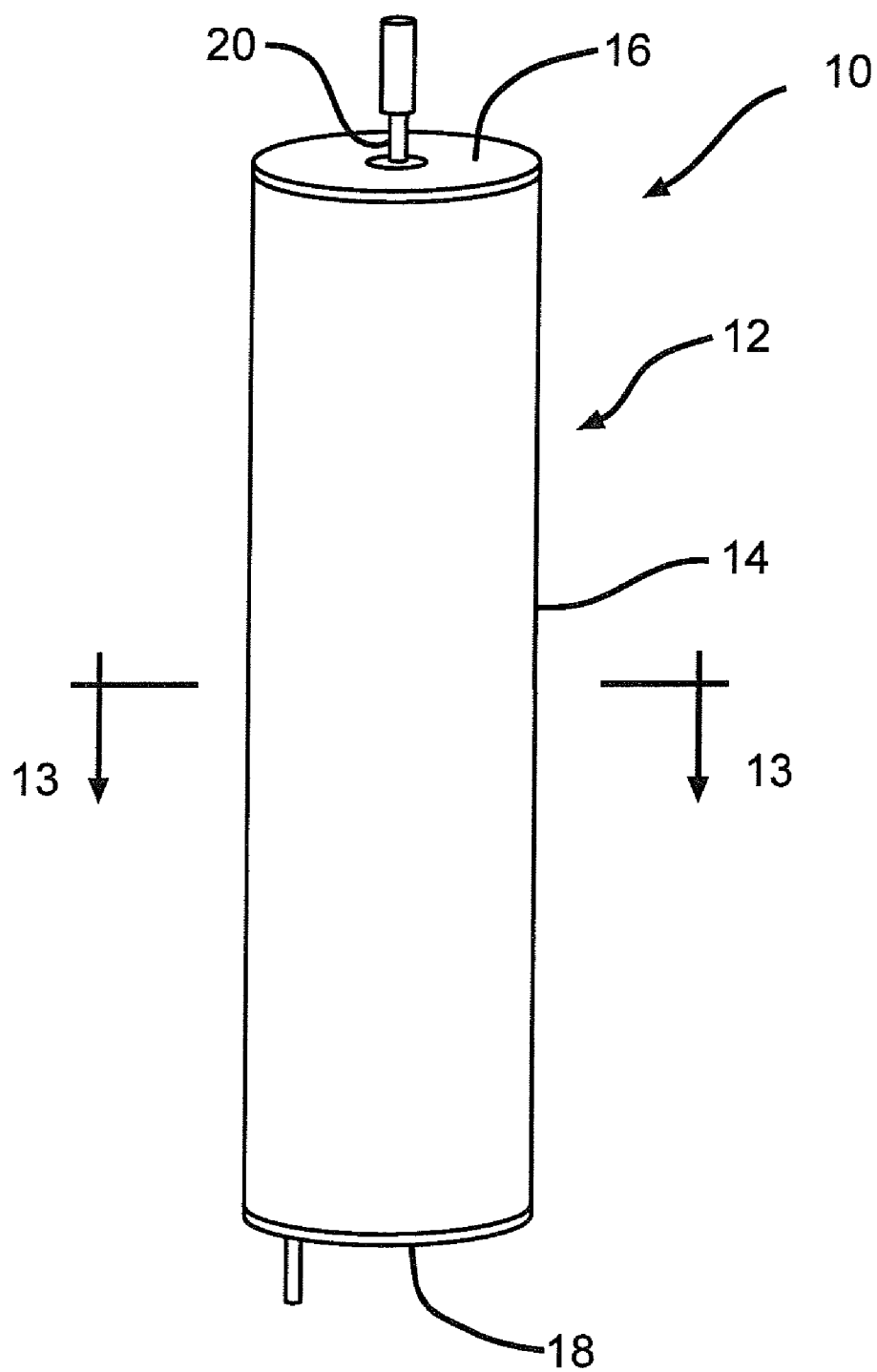
FIG. 1 is a perspective view of a capacitor 10 according to the present invention.
Figure 13:
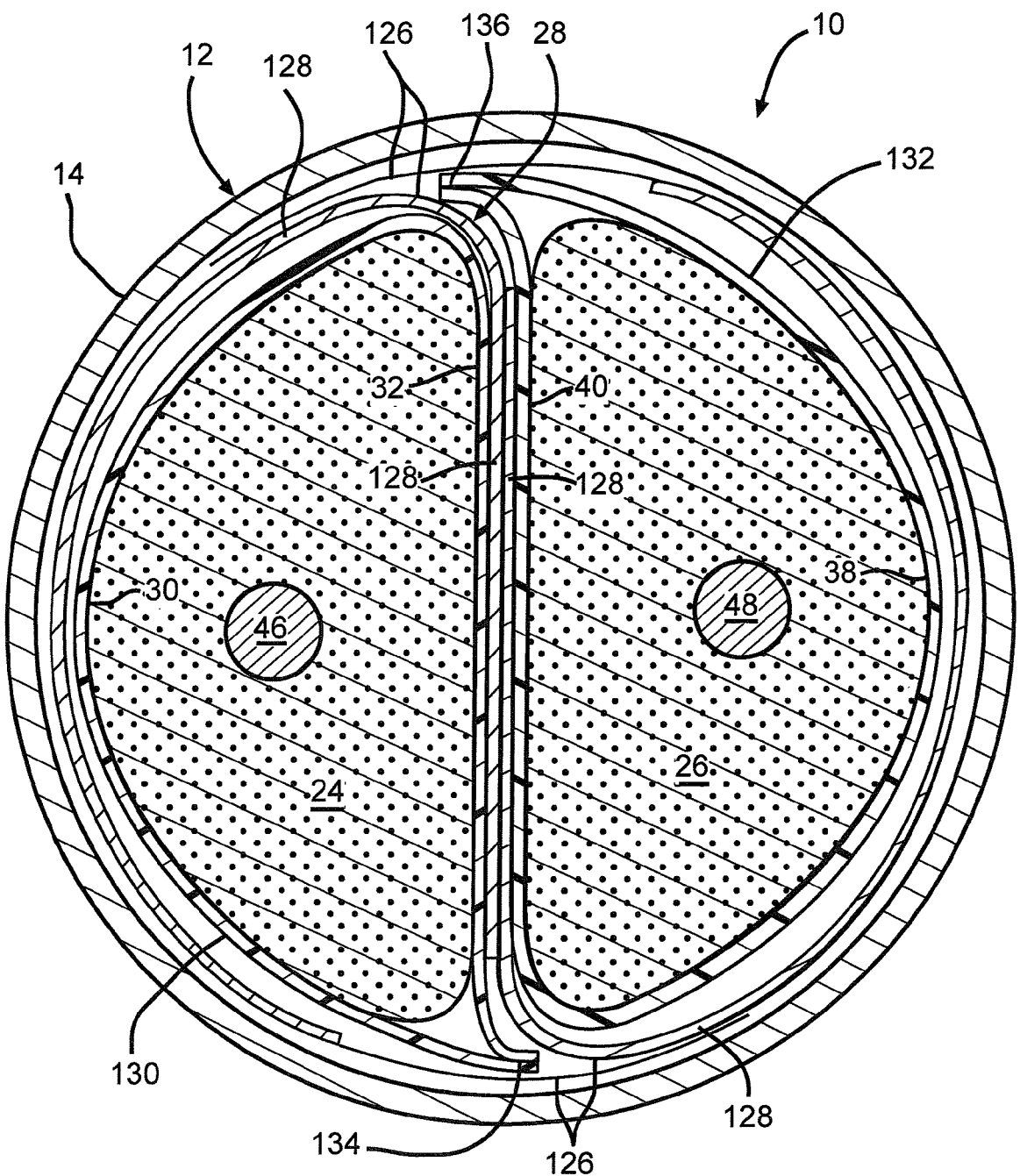
FIG. 13 is a cross-sectional view of the capacitor 10 taken along line 13-13 of FIG. 1.

Referring now to the drawings, FIGS. 1 and 13 show a capacitor 10 according to the present invention. Capacitor 10 has an elongated cylindrical shape with a casing 12 having a cylindrical casing sidewall or tube 14 extending to closed first and second end walls 16 and 18. The second end wall 18 may be formed separately as a cap that is fitted to the tubular sidewall 14 and sealed thereto to form a casing container. The first end wall 16 may also be formed as a cap that functions as a header for the casing container and for sealing an anode terminal pin or lead 20 therein. In later parts of this specification, the end wall 16 will be referred to as casing header 16.

Figure 4:
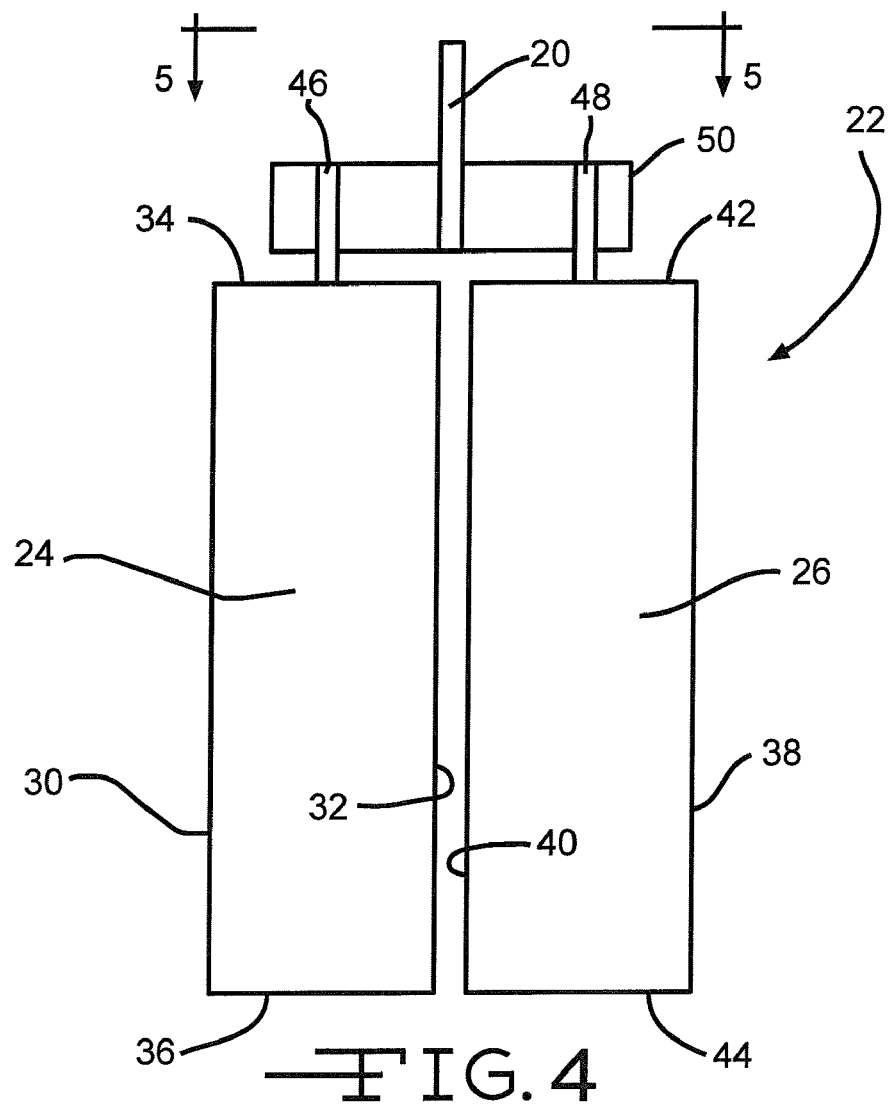
FIG. 4 is a side elevational view of an anode assembly 22 of a capacitor, which comprises the junction bar 50 of FIG. 2.
Figure 5:
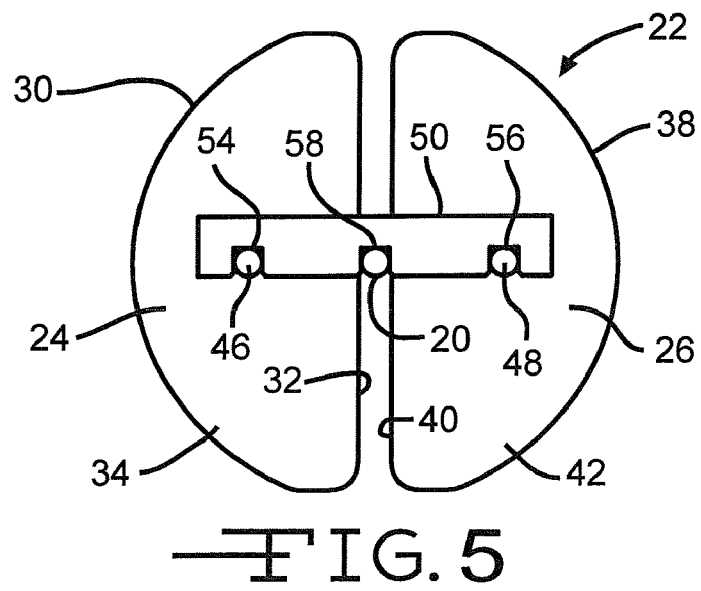
FIG. 5 is a plan view of the anode assembly 22 taken along line 5-5 of FIG. 4.

Referring also to FIGS. 4 and 5, the capacitor 10 comprises an anode assembly 22 of two side-by-side anodes 24 and 26, which are each formed as pellets of an anode active material. A cathode 28 (FIG. 13) is wrapped around the anode pellets 24, 26. The anode assembly 22 and cathode 28 are hermetically sealed inside the casing 12 and operatively associated with each other by a working electrolyte (not shown) contained therein. The capacitor 10 is of an electrolytic type with the cathode 28 comprising a conductive substrate supporting cathode active material having capacitive properties. The cathode 28 will be described in detail hereinafter.

The anodes 24, 26 may be formed as pellets of a powdered metal selected from the group consisting of tantalum, aluminum, titanium, niobium, zirconium, hafnium, tungsten, molybdenum, vanadium, silicon, germanium, and mixtures thereof. The preferred metal is tantalum powder compressed into a semi-cylindrical shape as shown for anodes 24 and 26. The anode assembly 22 has a cylindrical shape corresponding to the cylindrical shape of the casing 12 with a diameter slightly less than the casing diameter.

The anode 24 is comprised of a radiused anode sidewall 30 meeting a planar sidewall 32 extending to first and second anode end walls 34 and 36. In like manner, the anode 26 is comprised of a radiused anode sidewall 38 meeting a planar sidewall 40 extending to first and second anode end walls 42 and 44. The anodes 24 and 26 are in a side-by-side relationship having their respective planar sidewalls 32 and 40 facing each other.

Embedded anode wires or leads 46 and 48 extend from the respective end walls 34 and 42 of the anodes 24 and 26. The anode leads 46, 48 are preferably made of the same material as the anode active material. The anode pellets 24 and 26 are sintered under a vacuum at high temperatures and then anodized in a suitable electrolyte. The anodizing electrolyte fills the pores of the pressed powder bodies and a continuous dielectric oxide is formed thereon. In that manner, the anode pellets 24 and 26 and their extending leads 46 and 48 are provided with a dielectric oxide layer formed to a desired working voltage. The anodes 24 and 26 can also be of an etched aluminum, niobium, or titanium foil.

After anodizing to the desired formation voltage, the anodes 24 and 26 are brought into proximity with each other in the side-by-side relationship shown in FIGS. 4 and 5. The dielectric oxide is removed from the distal ends of the anode leads 46 and 48 and they are electrically connected to the anode terminal lead 20. The electrical connection of the anode leads 46 and 48 to the terminal lead 20 is made by joining each of them to a conductive junction bar 50.

Figure 2:
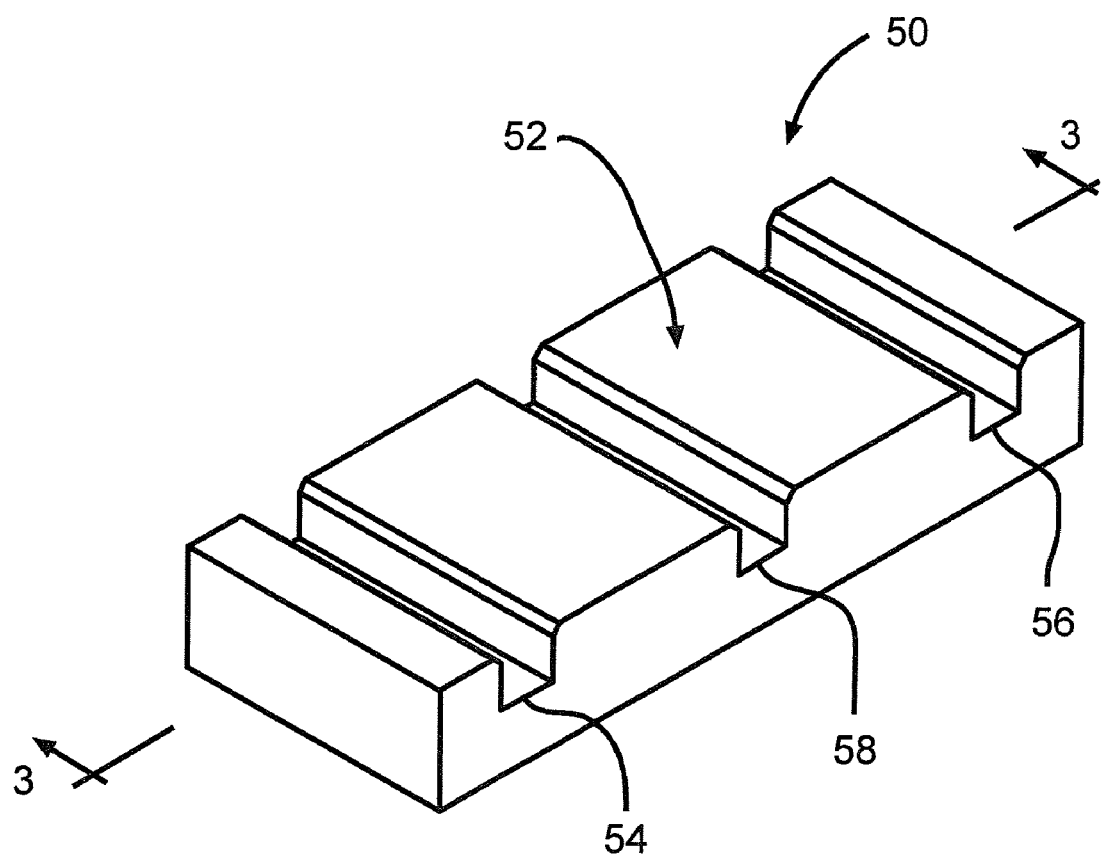
FIG. 2 is a perspective view of a first junction bar 50 for electrically connecting the anode leads and terminal leads of a capacitor.
Figure 3:
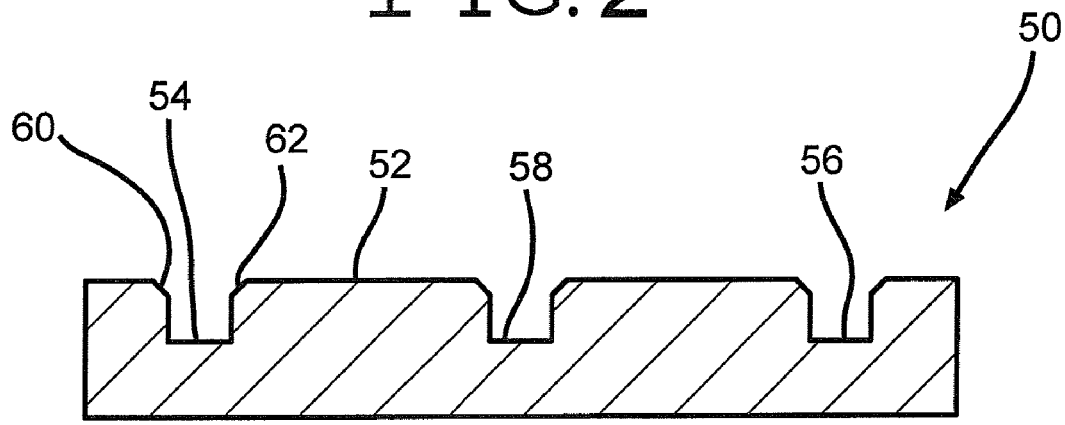
FIG. 3 is a cross-sectional view of the junction bar 50 taken along line 3-3 of FIG. 2.

Referring now to FIGS. 2 and 3, a first embodiment of a junction bar 50 is shown. The bar 50 is formed as a substantially rectangular slab of conductive material, although shapes other than rectangular may be suitable. The junction bar 50 is comprised of a surface 52 having a plurality of notches or grooves 54, 56, and 58 formed therein. Each of the grooves 54, 56, 58 is dimensioned to receive one of the anode leads 46 or 48, or the terminal lead 20. The grooves provided in the bar 50 of FIGS. 2 and 3 are substantially rectangular in cross-section. Groove shapes other than rectangular or square may also be suitable.

Referring also to FIG. 5, the anode lead 46 of the first anode 24 is disposed in groove 54, the anode lead 48 of the second anode 26 is disposed in groove 56, and the terminal lead 20 is disposed in groove 58 intermediate grooves 54 and 56. Each of the grooves 54, 56 and 58 may be provided with chamfers, such as chamfers 60 and 62 of groove 54, to guide placement of the leads into their respective grooves during the anode assembly fabrication process. The junction bar 50 may be manufactured by various processes including but not limited to micro-machining, water jet cutting, chemical etching, punching, and fine blanking.

Each of the leads 46, 48 and 20 may be joined to the bar 50 within their respective grooves 54, 56, 58 by dimensioning the grooves so that the leads are nested therein. In a preferred embodiment, the leads 46, 48 and 20 are joined to the junction bar 50 by welding. Accordingly, the bar 50 is made of a metal that is weldable to the leads. Suitable materials include tantalum, titanium, nickel, molybdenum, niobium, cobalt, stainless steel, tungsten, platinum, palladium, gold, silver, copper, chromium, vanadium, aluminum, zirconium, hafnium, zinc, iron, and mixtures and alloys thereof. Preferably the junction bar is of the same metal as the leads. For example, the anodes 24 and 26, the leads 46, 48 and 20 and the junction bar 50 may all be made of tantalum.

Figure 6:
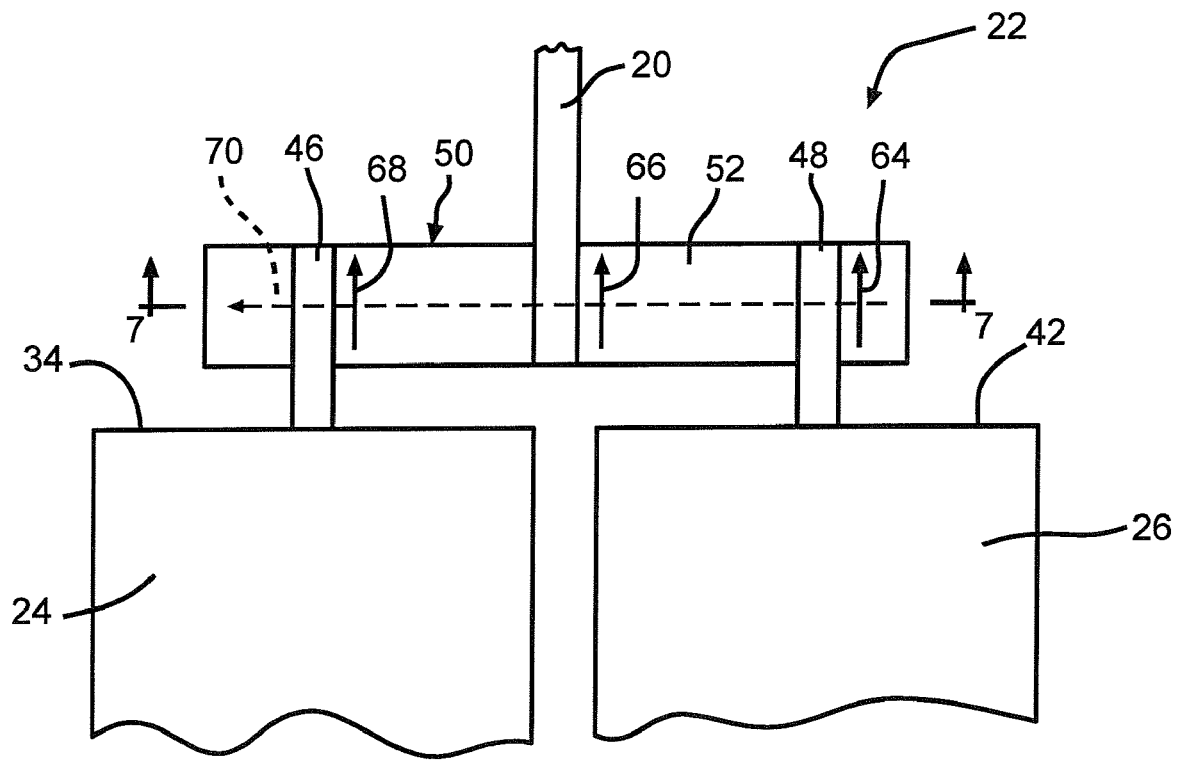
FIG. 6 is a detailed side elevation view of the anode assembly 22 of FIG. 4 showing the anode leads 46, 48 and terminal lead 20 disposed in grooves 54, 56 and 58 provided in the junction bar 50.
Figure 7:
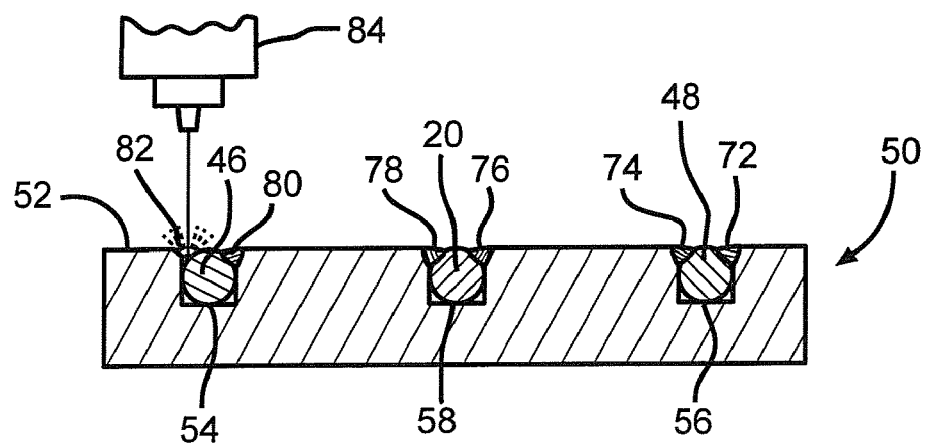
FIG. 7 is a cross-sectional view along line 7-7 of FIG. 6 of a method for joining the junction bar 50 and leads 46, 48 and 20.

FIG. 6 is a side elevation view of the anode assembly of FIG. 4, showing the anode leads 46, 48 and terminal lead 20 disposed in the respective grooves 54, 56 and 58 provided in the junction bar 50. One sequential path for the operation of a welder is indicated by arrows 64, 66, 68 and 70, wherein lead 48 is welded to groove 56, lead 20 is welded to groove 58, and lead 46 is welded to groove 54. Referring also to FIG. 7, the leads 46, 48 and 20 are preferably "double welded" along both contact lines formed with the respective grooves 54, 56 and 58. Lead 48 is joined to groove 56 by welds 72 and 74. Lead 20 is joined to groove 58 by welds 76 and 78. And, lead 46 is joined to groove 54 by weld 80 and 82, the latter being shown in the process of being welded by laser 84. The leads 46, 48 and 20 are preferably dimensioned so as to be press-fitted into their respective grooves 54, 56, and 58. In that manner, no additional tooling is required to hold them in place until they are fully secured by welding.

In order to avoid generation of potentially harmful contaminants that could weaken the microstructure of the weld or be incompatible with the chemistry of the capacitor, the welding process is preferably carried out under vacuum. Alternatively, the welding process may be performed in an inert atmosphere, such as nitrogen ($N_2$) or argon.

The grooves that receive the anode and terminal leads may have various shapes. FIGS. 8 to 10 illustrate yet another embodiment of a junction bar 86 for electrically connecting two anode leads to the terminal lead of a capacitor. The bar 86 is formed as a substantially rectangular slab of conductive material and is comprised of a surface 88 having a plurality of grooves 90, 92 and 94 formed therein. Each of the grooves 90, 92 and 94 is dimensioned to receive one of the anode leads 46 or 48, or the terminal lead 20. The grooves 90, 92 and 94 are substantially semi-circular in cross-section. During the process of welding the leads in their respective grooves, a tool (not shown) may be provided for holding the leads in place until connection to the junction bar 86 is complete.

The grooves 90, 92 and 94 may include additional opposed planar portions. For example, groove 90 is comprised of a semi-circular portion 96 and opposed planar portions 98 and 100. In that manner, the depth of the grooves 90, 92 and 94 is increased. The leads can be recessed deeper into their respective grooves, and stronger welds between the leads 46, 48 and 20 and the junction bar 86 can be attained. Referring specifically to FIG. 10, it is shown that the anode lead 46 of the first anode 24 is disposed in groove 90, the anode lead 48 of the second anode 26 is disposed in groove 92, and the terminal lead 20 is disposed in groove 94. Welds (not shown) are provided to join the leads 46, 48 and 20 to the junction bar 86. In a particularly preferred embodiment, the arc portion of the grooves 46, 48 and 20 is slightly greater than 180 degrees, such that the leads snap-fit into their respective grooves.

Figure 14:
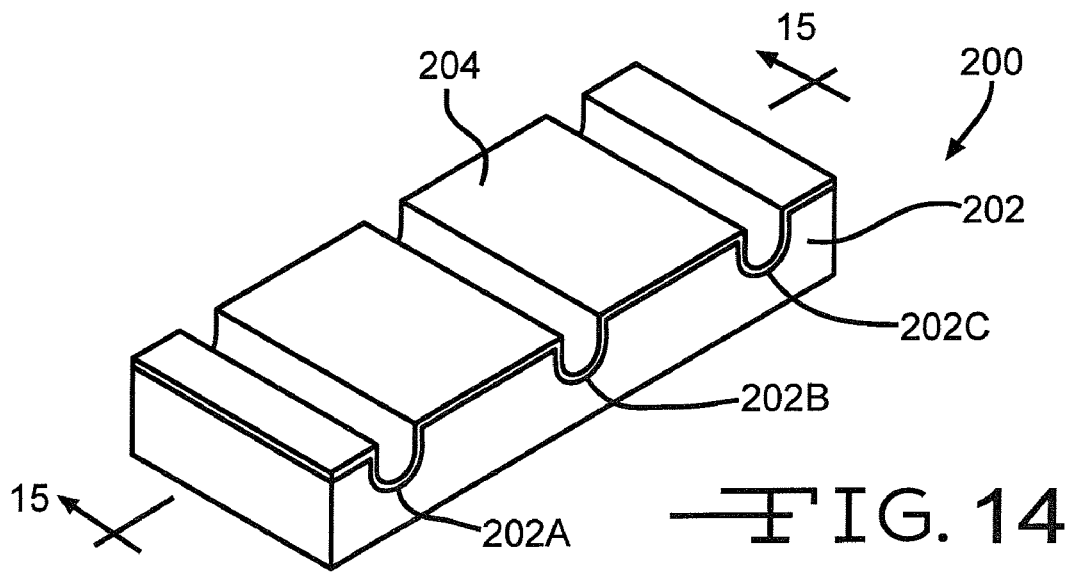
FIG. 14 is a perspective view of an alternate embodiment of a junction bar 200 according to the present invention.
Figure 15:
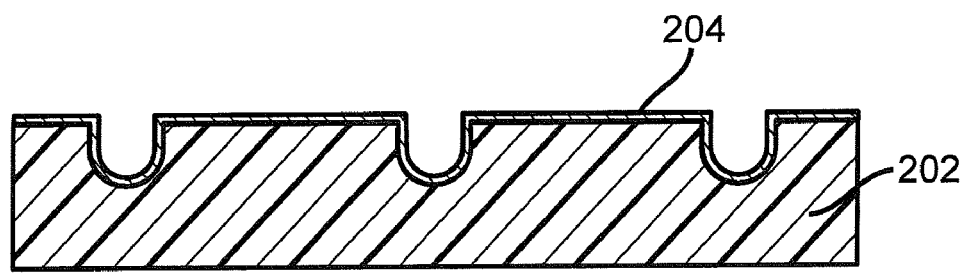
FIG. 15 is a cross-sectional view taken along line 15-15 of FIG. 14.

According to the present invention, the junction bar does not necessarily need to be a solid conductive object such as a metal bar. FIGS. 14 and 15 illustrate an alternate embodiment of a junction bar 200 having a shape similar to that of junction bar 50. Junction bar 200 comprises a body 202 of a polymeric or some other non-conductive material. The body includes grooves 202A, 202B and 202C for receiving the leads 46, 48 and 20 therein. An upper plate 204 is supported thereon and has a shape conforming to that of the body 202 including its grooves. Plate 204 is of an electrically conductive material such as of those previously described as useful for junction bar 50, but preferably of tantalum. Electrical conductivity is then provided from the anode leads 46 and 48 through the conductive plate 204 and to the terminal lead 20.

Figure 16:
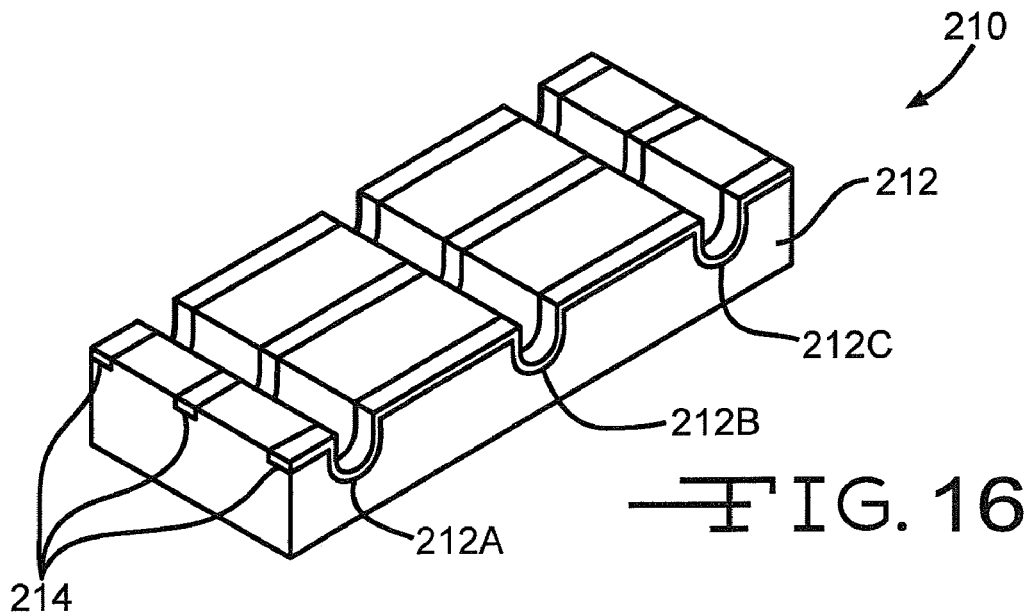
FIG. 16 is a perspective view of another embodiment of a junction bar 210 according to the present invention.

FIG. 16 shows another embodiment of a junction bar 210 having a shape similar to that of junction bar 50. Junction bar 210 comprises a body 212 of a polymeric or some other non-conductive material. The body includes grooves 212A, 212B and 212C for receiving the leads 46, 48 and 20 therein. At least one conductive strip 214 having a generally rectangular cross-section and a width that is significantly less than that of the body 212 is supported thereon. There is preferably a plurality of conductive strips 214 shaped to conform to that of the body 212 including its grooves. The conductive strips are of an electrically conductive material such as of any of those previously described as useful for junction bar 50, but preferably of tantalum. Electrical conductivity is then provided from the anode leads 46 and 48 through the conductive strips 214 and to the terminal lead 20.

FIGS. 17 and 18 illustrate an alternate embodiment of a junction bar 220 having a shape similar to that of junction bar 50. Junction bar 220 comprises a body 222 of a polymeric or some other non-conductive material. The body 222 includes grooves 222A, 222B and 222C for receiving the leads 46, 48 and 20 therein. The body includes conductive fibers or wires 224 embedded therein. The fibers or wires 224 are of an electrically conductive material such as of those previously described as useful for junction bar 50, but preferably of tantalum. Electrical conductivity is then provided from the anode leads 46 and 48 through the conductive fibers or wires 224 and to the terminal lead 20.

FIGS. 19 and 20 illustrate a further embodiment of a junction bar 230 having a shape similar to that of junction bar 50. Junction bar 230 comprises a body 232 of a polymeric or some other non-conductive material. The body includes grooves 232A, 232B and 232C for receiving the leads 46, 48 and 20 therein. At least one conductive rod 234 having a generally circular cross-section of a diameter that is significantly less than the width of the body 212 is supported thereon. There is preferably a plurality of conductive rods 234 shaped to conform to the body 232 including its grooves. The conductive rods are of an electrically conductive material such as of any of those previously described as useful for junction bar 50, but preferably of tantalum. Electrical conductivity is then provided from the anode leads 46 and 48 through the conductive rods 234 and to the terminal lead 20.

Figure 11:
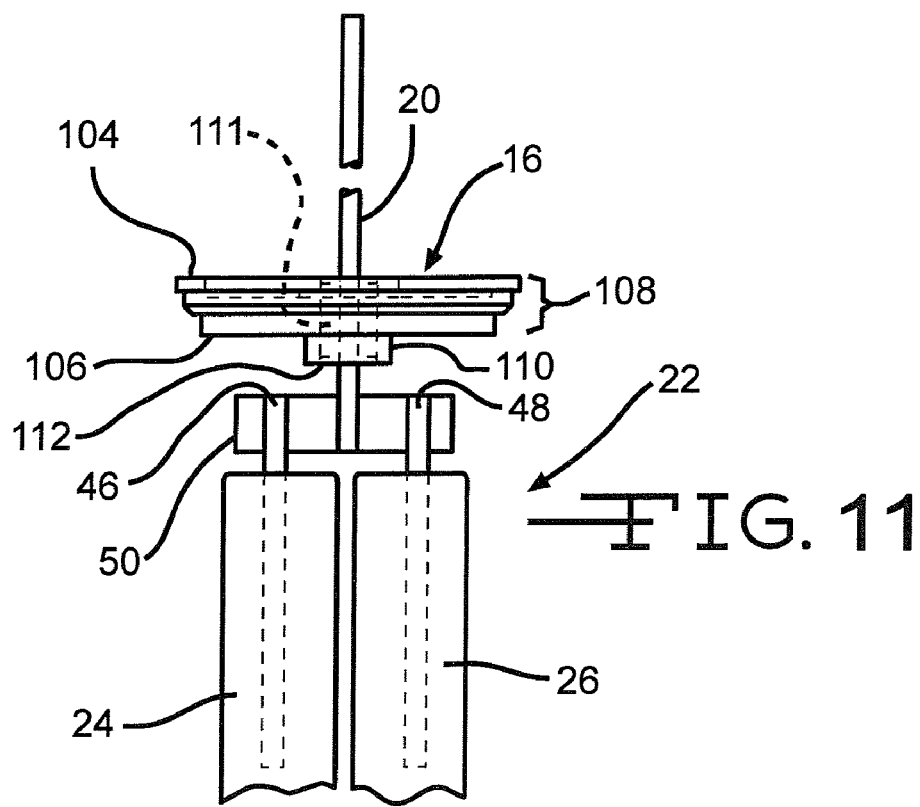
FIG. 11 is a side elevational view of the anode assembly 102 of FIG. 4, wherein the terminal lead 20 thereof has been sealed within a glass-to-metal seal 111 of a capacitor casing lid 16.

In assembling the capacitor 10 including the anode assembly 22 of FIG. 2 or the anode assembly 102 of FIG. 10, the anode terminal lead 20 is sealed and electrically insulated from a casing lid or header. Referring now to FIG. 11, terminal lead 20 is sealed within a glass-to-metal seal formed within a through hole in the casing header 16. The header 16 comprises the first end wall previously described with respect to FIG. 1 and is a unitary metal member such as of titanium having a cylindrical shape in cross-section and comprising an upper planar surface 104 spaced from a lower planar surface 106. Between the planar surfaces 104, 106, the header 16 includes a perimeter region 108 comprised of an outer diameter leading to a step that joins to a frusto-conical portion that steps down to an inner diameter portion. This perimeter configuration is provided for engagement with the sidewall 14 of the casing 12, and for optimal support and electrical connection with the cathode 28 (FIG. 13) of capacitor 10. Additional details of one suitable configuration of the perimeter region 108 are provided in the aforementioned commonly owned U.S. Pat. No. 7,072,171.

A ferrule 110 for the glass-to-metal-seal (GTMS), which seals and electrically insulates the terminal pin 20 within the header 16 may be formed integrally with the header. The ferrule 110 has a cylindrical sidewall spaced inwardly from the inner diameter portion and comprises a lower side 112 spaced below the lower header surface 106.

The GTMS comprises the ferrule 110 defining an internal cylindrical through bore or passage of constant inside diameter. An insulative glass 111 within the through bore provides a hermetic seal between the ferrule 110 and the anode terminal pin 20 passing there through. The insulative glass, for example, may be ELAN® type 88 or MANSOL™ type 88. To provide support against shock and vibration conditions, a relatively fast curing polymeric material (not shown), such as a polyolefin, a fluoropolymer, a hot melt adhesive, or a UV curable adhesive may be filled into the space between the opposed planar end walls of the anode pellets 24 and 26 and the lower header surface 106 to the edge forming the inner diameter portion of the header. A relatively slow curing silastic material may also be useful.

Figure 12:
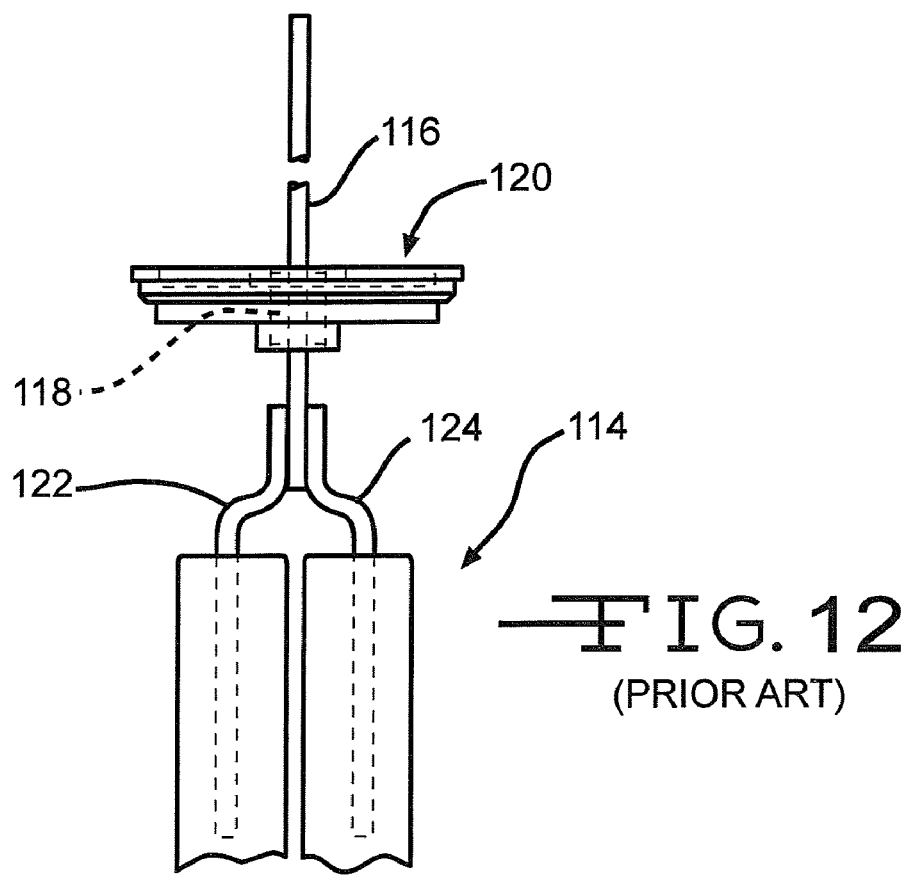
FIG. 12 is a side elevational view of a prior art anode assembly 114 showing a terminal lead 116 sealed within a glass-to-metal seal 118 of a capacitor casing lid 120.

FIG. 12 is a side elevation view of a prior art capacitor including an anode assembly 114 having the terminal lead 116 thereof sealed within a glass-to-metal seal 118 of a capacitor casing header 120. The anode assembly 22 of FIG. 11 is advantageous over the prior art anode assembly 114 of FIG. 12. By using the junction bar 50 to connect the anode leads 46 and 48 to the terminal lead 20, less space is required between the lower surface 106 of the header and the upper end walls of the anodes 24 and 26. Thus more internal volume of the capacitor 10 (FIG. 1) can be filled with electrode active materials, thereby increasing the overall energy density of the capacitor. Additionally, no precision bends are required in the anode leads 46 and 48 to align them with their respective grooves in the junction bar 50. In contrast, the anode leads 122 and 124 of the prior art anode assembly 114 must be precisely bent to align them with the terminal pin 116 before they are joined together. The use of the junction bar 50 enables connection of the anode leads 46 and 48 to the terminal lead 20 to be made reliably and without the need for costly tooling to bend the leads and hold them in position against the terminal pin during welding.

A capacitor that includes the anode assembly 22 of FIG. 4 or the anode assembly 102 of FIG. 8 is further comprised of a cathode comprising a conductive substrate supporting a cathode active material facing the first and second anodes, and a separator positioned between the first and second anodes and the cathode to prevent them from contacting each other. FIG. 13 is a cross-sectional view of one exemplary embodiment of such a capacitor 10, which includes the anode assembly 22 with anodes 24 and 26, and a cathode 28.

The cathode 28 includes a conductive substrate 126 supporting a cathode active material 128 facing the sidewalls of the anodes 24 and 26. The cathode active material 128 is disposed on both sides of the conductive substrate 126 in the cathode portion that is located between the opposed planar sidewalls 32 and 40. The conductive substrate 126 is wrapped around the anodes 24 and 26 such that cathode active material 128 faces the radiused anode sidewalls 30 and 38 of the respective anodes 24 and 26. Further details of a cathode suitably configured according to the illustrated embodiment for use in the capacitor 10 may be found in the aforementioned U.S. Pat. No. 7,072,171.

The substrate 126 is of a material selected from titanium, tantalum, nickel, molybdenum, niobium, cobalt, stainless steel, tungsten, platinum, palladium, gold, silver, copper, chromium, vanadium, aluminum, zirconium, hafnium, zinc, iron, and mixtures and alloys thereof. Preferably, the substrates are of titanium and are from about 0.0005 inches to about 0.02 inches thick, preferably about 0.001 inches thick.

The cathode active material 128 has a thickness of about a few hundred Angstroms to about 0.1 millimeters coated directly on the conductive substrate 126. In that respect, the conductive substrate 126 may be of an anodized-etched conductive material, have a sintered active material with or without oxide contacted thereto, be contacted with a double layer capacitive material, for example a finely divided carbonaceous material such as activated graphite or activated carbon black, a redox, pseudocapacitive or an under potential material, or be an electroactive conducting polymer such as polyaniline, polypyrrole, polythiophene, polyacetylene, and mixtures thereof.

According to one preferred aspect of the present invention, the redox or cathode active material 128 includes an oxide of a metal, the nitride of the metal, the carbon nitride of the metal, and/or the carbide of the metal, the oxide, nitride, carbon nitride and carbide having pseudocapacitive properties. The metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, lead gold, silver, cobalt, and mixtures thereof. The cathode active material 128 can also be an activated carbonaceous material such as carbon nanotubes or amorphous carbon.

One of the pad printing processes described in U.S. Pat. No. 7,116,547 to Seitz et al. is preferred for coating selected locations of the substrate 126 with the cathode active material 128. An ultrasonically generated aerosol as described in U.S. Pat. Nos. 5,894,403; 5,920,455; 6,224,985; and 6,468,605, all to Shah et al., is also suitable. These patents are assigned to the assignee of the present invention and incorporated herein by reference.

A separator of electrically insulative material in the shape of a bag completely surrounds and envelops each anode 24, 26 except their respective leads 46 and 48. Separator bags 130 and 132 may include seamed overlaps 134 and 136 extending longitudinally along the respective anodes 24, 26. The separator prevents an internal electrical short circuit between the anode pellets 24, 26 of the anode assembly 22 and the cathode active material 128 in the assembled capacitor and has a degree of porosity sufficient to allow flow there through of the working electrolyte during the electrochemical reaction of the capacitor 10. Illustrative separator materials include woven and non-woven fabrics of polyolefinic fibers including polypropylene and polyethylene or fluoropolymeric fibers including polyvinylidene fluoride, polyethylenetetrafluoroethylene, and polyethylenechlorotrifluoroethylene laminated or superposed with a polyolefinic or fluoropolymeric microporous film, non-woven glass, glass fiber materials and ceramic materials. Suitable microporous films include a polyethylene membrane commercially available under the designation SOLUPOR® (DMS Solutech), a polytetrafluoroethylene membrane commercially available under the designations EXCELLERATOR™ (W.R. Gore), ZITEX® (Chemplast Inc.), a polypropylene membrane commercially available under the designation CELGARD® (Celanese Plastic Company, Inc.), and a membrane commercially available under the designation DEXIGLAS® (C.H. Dexter, Div., Dexter Corp.). Cellulose based separators also typically used in capacitors are contemplated by the scope of the present invention. Depending on the electrolyte used, the separator can be treated to improve its wettability, as is well known by those skilled in the art.

The thusly-constructed electrode assembly including the anodes 24 and 26, the cathode 28, the separator bags 130 and 132, and the header 16 is next fitted to a casing tube 14. The tube 14 is a cylindrically shaped member that is open at both of its ends and made of the same metal as the header 16, for example, titanium. With the electrode assembly housed therein, the upper open-end of the tube 14 fits into a corresponding outer step of the header 16. Laser welding then hermetically seals the tube 14 to the header 16 at this junction.

The lower ends of the anode pellets 24, 26 and the lower edge of the conductive substrate 126 of the associated cathode 24 are spaced from the lower open end of the tube 14. A lower lid 18 (FIG. 1) is fitted in the lower open end of the tube 14 to close the capacitor 10. The lower lid 18 is a unitary metal member of the same material as the header 16 and casing tube 14. As described and shown in commonly owned U.S. Pat. No. 7,072,171, the lower lid 18 has a cylindrical shape in cross-section and comprises an upper planar surface spaced from a lower planar surface, and an outer diameter leading to a step that joins to a frusto-conical portion tapering downwardly and inwardly to the lower surface. The step is sized to fit into the lower open-end of the tube 14 in a snug-fitting relationship and is hermetically sealed therein, preferably by laser welding. In that manner, the header 16 closing the upper open end of the tube 14 and the lower lid 18 closing the lower open end form the casing 12 for the capacitor 10.

The lower lid 18 may be further provided with an opening (not shown) for filling a working electrolyte (not shown) into the casing. After the electrolyte is filled into the capacitor 10, a plug (not shown) is sealed in the opening by laser welding to hermetically close the casing 12.

It is to be understood that although the use of a junction bar 50, 86, 200, 210, 220 and 230 to connect capacitor anode leads to a terminal lead has been described for a capacitor comprising two anodes, the present invention is not limited to use in a capacitor with only two anodes. The capacitor may be comprised of three or more anodes as described in the aforementioned commonly owned U.S. Provisional Application Ser. No. 61/050,716, filed May 6, 2008. The leads of the three or more anodes may be connected to a terminal lead by joining them to a junction bar. Since the leads may not necessarily be oriented in a straight line as in the anode assembly 22 of FIG. 4 (the longitudinal axis of the anode leads and the terminal lead may be in other than a parallel relationship), the grooves provided in the junction bar for receiving the leads may be cut to different depths, or located on different surfaces. Alternatively or additionally, the junction bar may have a shape differing from the simple rectangular shape of junction bars 50, 86 200, 210, 220 and 230 of respective FIGS. 2, 7, 14, 16, 17 and 19.

Alternatively, the leads may be offset in their respective anode pellets such that in the overall anode assembly, they are disposed in a straight line to enable connection to a common surface of the junction bar.

It is, therefore, apparent that there has been provided, in accordance with the present invention, a capacitor including multiple anodes having leads that are connected to a terminal lead through a conductive junction bar. While this invention has been described in conjunction with preferred embodiments thereof, it is evident that many alternatives, modifications, and variations will be apparent to those skilled in the art. Accordingly, the present invention is intended to embrace all such alternatives, modifications and variations that fall within the broad scope of the appended claims.

What is claimed is:

1. A capacitor, which comprises:
   a) a casing;
   b) a junction bar comprising a conductive material and at least a first groove, a second groove, and a third groove;
   c) an anode assembly comprising:
      i) at least a first anode including a first conductive anode lead electrically connected to the first junction bar groove, and
      ii) a second anode including a second conductive anode lead electrically connected to the second junction bar groove;
   d) a terminal anode lead having a length extending from a proximal terminal anode lead portion electrically connected to the third junction bar groove to a distal terminal anode lead portion, wherein at least the distal terminal anode lead portion has a substantially circular cross-section perpendicular to its length where it is sealed in an insulating glass of a glass-to-metal seal that electrically insulates the first and second anode leads and the terminal anode lead from the casing with a distal end of the distal terminal anode lead portion extending out beyond the insulating glass and the casing;
   e) a cathode comprising a conductive substrate supporting a cathode active material facing the first and second anodes;
   f) a separator positioned between the first and second anodes and the cathodes to prevent them from contacting each other; and
   g) a working electrolyte contained inside the casing.

2. The capacitor of claim 1 wherein the conductive material comprising the junction bar is selected from the group consisting of tantalum, titanium, nickel, molybdenum, niobium, cobalt, stainless steel, tungsten, platinum, palladium, gold, silver, copper, chromium, vanadium, aluminum, zirconium, hafnium, zinc, iron, and mixtures and alloys thereof.

3. The capacitor of claim 1 wherein the junction bar is of a non-electrically conductive material supporting an electrically conductive material selected from the group consisting of a plate of conductive material supported thereon, at least one strip of conductive material supported thereon, at least one rod of conductive material supported thereon, embedded fibers of conductive material, and embedded wires of conductive material.

4. The capacitor of claim 1 wherein the first, second, and third grooves are either rectangular or semi-circular in cross-section.

5. The capacitor of claim 1 wherein the first anode lead, the second anode lead, and the terminal anode lead are press-fit into the respective first, second and third grooves of the junction bar.

6. The capacitor of claim 1 wherein the first anode lead, the second anode lead, and the terminal anode lead are joined to the junction bar by welding.

7. The capacitor of claim 1 wherein the first and second anodes are comprised of a radiused anode sidewall portion meeting a planar sidewall portion extending to first and second anode end walls, and wherein the first and second anodes are in a side-by-side relationship having their respective planar sidewall portions facing each other.

8. The capacitor of claim 1 wherein the junction bar is intermediate the first and second anodes and the glass-to-metal seal.

9. The capacitor of claim 1 wherein the terminal anode lead residues at an intermediate location between the first and second anode leads.

10. The capacitor of claim 1 wherein at least a portion of the first and second anode leads and the terminal anode lead residue along respective first, second and third longitudinal axes and the respective longitudinal axes are aligned along a common plane where the leads are electrically connected to the junction bar.

11. The capacitor of claim 1 wherein at least one of the first, second and third junction bar grooves is comprised of a semi-circular portion meeting opposed planar portions extending to an outer surface of the junction bar.

12. The capacitor of claim 1 wherein at least a portion of the first and second anode leads and the terminal anode lead residue along respective first, second and third longitudinal axes and at least one of the first and second anode leads and the terminal anode load has a circular cross-section perpendicular to its longitudinal axis.

13. An anode assembly for a capacitor, the anode assembly comprising:
 a) a junction bar comprising a conductive material having a substantially planar face and at least a first groove, a second groove, and a third groove;
 b) a first anode including a first conductive anode lead electrically connected to the first junction bar groove;
 c) a second anode including a second conductive anode lead electrically connected to the second junction bar groove; and
 d) a terminal anode lead having a length extending from a proximal terminal anode lead portion electrically connected to the third junction bar groove to a distal terminal anode lead portion, wherein at least the distal terminal anode lead portion has a substantially circular cross-section perpendicular to its length where it is sealable in a glass-to-metal seal to electrically insulate the first and second anode leads and the terminal anode lead from a casing for a capacitor, and
 e) wherein a least a portion of the first and second anode leads and the terminal anode lead reside along respective first, second and third longitudinal axes where they are electrically connected to the junction bar with the respective longitudinal axes being aligned along a common plane perpendicular to the face of the junction bar.

14. The anode assembly of claim 13 the conductive material comprising the junction bar is selected from the group consisting of tantalum, titanium, nickel, molybdenum, niobium, cobalt, stainless steel, tungsten, platinum, palladium, gold, silver, copper, chromium, vanadium, aluminum, zirconium, hafnium, zinc, iron, and mixtures and alloys thereof.

15. The anode assembly of claim 13 wherein the junction bar is of a non-electrically conductive material supporting an electrically conductive material selected from the group consisting of a plate of conductive material supported thereon, at least one strip of conductive material supported thereon, at least one rod of conductive material supported thereon, embedded fibers of conductive material, and embedded wires of conductive material.

16. The anode assembly of claim 13 wherein the first, second, and third grooves are either rectangular or semi-circular in cross-section.

17. The anode assembly of claim 13 wherein the first anode lead, the second anode lead, and the terminal anode lead are press-fit into the respective first, second and third grooves of the junction bar.

18. The anode assembly of claim 13 wherein the first anode lead, the second anode lead, and the terminal anode lead are joined to the junction bar by welding.

19. The anode assembly of claim 13 wherein the first and second anodes are comprised of a radiused anode sidewall portion meeting a planar sidewall portion extending to first and second anode end walls, and wherein the first and second anode are in a side-by-side relationship having their respective planar sidewall portions facing each other.

20. A method for making a capacitor, comprising the steps of:
 a) providing a junction bar comprised of a conductive material and at least a first groove, a second groove, and a third groove;
 b) providing a least a first and a second anodes,
  i) the first anode comprising a first conductive anode lead, and
  ii) the second anode comprising a second conductive anode lead; and
  iii) providing a terminal anode lead having a length extending from a proximal terminal anode lead portion to a distal terminal anode lead portion, wherein at least the distal terminal anode lead portion has a substantially circular cross-section section perpendicular to its length;
 c) sealing the distal terminal anode lead portion in an insulating glass of a glass-to-metal seal at the substantially circular cross-section portion;
 d) electrically joining the first conductive anode lead to the first junction bar groove, the second conductive anode lead to the second junction bar groove, and the terminal anode lead to the third junction bar groove;
 e) providing a cathode comprising a first conductive substrate supporting a cathode active material facing the first and second anodes, but with an intermediate separator preventing the anodes from contacting the cathode to thereby form an electrode assembly;
 f) sealing a casing lid supporting the glass-to-metal seal to a casing to enclose the electrode assembly, wherein the glass-to-metal seal electrically insulates the first and second anode leads and the terminal anode lead from the casing with a distal and of the distal terminal anode lead portion extending out beyond the insulating glass and the casing; and
 g) filling a working electrolyte inside the casing through a fill port, and sealing the fill port.

21. The method of claim 20 including selecting the conductive material comprising the junction bar from the group consisting of tantalum, titanium, nickel, molybdenum, niobium, cobalt, stainless steel, tungsten, platinum, palladium, gold, silver, copper, chromium, vanadium, aluminum, zirconium, hafnium, zinc, iron, and mixtures and alloys thereof.

22. The method of claim 20 including providing the junction bar being of a non-electrically conductive material supporting an electrically conductive material selected from the group consisting of a plate supporting a conductive material thereon, at least one strip of conductive material supported thereon, at least one rod of conductive material supported thereon, embedded fibers of conductive material, and embedded wires of conductive material.

23. The method of claim 20 including providing the first, second, and third grooves being either rectangular or semi-circular in cross-section.

24. The method of claim 20 including press fitting the first anode lead, the second anode lead, and the terminal anode lead into the respective first, second and third grooves of the junction bar.

25. The method of claim 20 including welding the first anode lead, the second anode lead and the terminal anode lead to the junction bar.

* * * * *

UNITED STATES PATENT AND TRADEMARK OFFICE
CERTIFICATE OF CORRECTION

| | | |
|---|---|---|
| PATENT NO. | : 8,081,419 B2 | Page 1 of 1 |
| APPLICATION NO. | : 12/250598 | |
| DATED | : December 20, 2011 | |
| INVENTOR(S) | : Donald Monroe et al. | |

It is certified that error appears in the above-identified patent and that said Letters Patent is hereby corrected as shown below:

Column 10, line 48 delete "cathodes" and insert -- cathode --

Column 12, line 57 delete "and" and insert -- end --

Signed and Sealed this
Thirty-first Day of January, 2012

David J. Kappos
*Director of the United States Patent and Trademark Office*